(12) United States Patent
Fourney et al.

(10) Patent No.: US 7,861,847 B2
(45) Date of Patent: Jan. 4, 2011

(54) ROLLER-BELT DEPALLETIZER

(75) Inventors: Matthew L. Fourney, Laurel, MD (US); Eric M. Pressler, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 12/473,797

(22) Filed: May 28, 2009

(65) Prior Publication Data
US 2010/0300836 A1  Dec. 2, 2010

(51) Int. Cl.
*B65G 47/26* (2006.01)
(52) U.S. Cl. .................................. 198/433; 198/419.2
(58) Field of Classification Search .............. 198/419.2, 198/433, 461.2, 443
See application file for complete search history.

(56) References Cited

U.S. PATENT DOCUMENTS

| | | | | |
|---|---|---|---|---|
| 3,534,872 | A | * | 10/1970 | Roth et al. .................. 198/443 |
| 3,967,737 | A | * | 7/1976 | Peralta et al. ............... 198/433 |
| 4,039,074 | A | | 8/1977 | Maxted |
| 5,238,099 | A | | 8/1993 | Schroeder et al. |
| 5,360,306 | A | * | 11/1994 | Nakayama et al. ....... 198/419.2 |
| 5,746,572 | A | * | 5/1998 | Winski ..................... 198/419.2 |
| 5,769,204 | A | | 6/1998 | Okada et al. |
| 5,842,557 | A | * | 12/1998 | Montemayor et al. .... 198/418.1 |
| 5,950,800 | A | | 9/1999 | Terrell et al. |
| 6,131,372 | A | * | 10/2000 | Pruett ...................... 198/419.2 |
| 6,202,827 | B1 | * | 3/2001 | Drewitz ....................... 198/433 |
| 6,318,544 | B1 | | 11/2001 | O'Connor et al. |
| 6,401,936 | B1 | | 6/2002 | Isaacs et al. |
| 6,494,312 | B2 | | 12/2002 | Costanzo |
| 6,571,937 | B1 | | 6/2003 | Costanzo et al. |
| 6,758,323 | B2 | | 7/2004 | Costanzo |
| 6,968,941 | B2 | | 11/2005 | Fourney |
| 7,249,669 | B2 | | 7/2007 | Fourney |
| 7,284,653 | B2 | | 10/2007 | Fourney et al. |
| 7,311,192 | B2 | | 12/2007 | Fourney |
| 7,344,018 | B2 | | 3/2008 | Costanzo et al. |
| 7,426,992 | B2 | | 9/2008 | Fourney |

(Continued)

FOREIGN PATENT DOCUMENTS

DE    102007034519 A1    1/2007

OTHER PUBLICATIONS

PCT/US10/36057, The International Search Report and the Written Opinion of the International Searching Authority, Jul. 15, 2010, European Patent Office, Rijswijk, NL.

*Primary Examiner*—James R Bidwell
(74) *Attorney, Agent, or Firm*—James T. Cronvich

(57) ABSTRACT

A conveyor and a method for depalletizing and singulating packages. The conveyor comprises, in one version, a set-down conveyor on which pallet layers are deposited and conveyed, a row-separation conveyor that separates the pallet layer into spaced rows, a row-extraction conveyor that extracts a leading row of packages from the trailing rows and conveys the packages of the extracted row in a transverse direction, and a singulating conveyor that arranges the articles in a single file. The conveyor system operates by first pulling a gap in the leading row of a pallet layer when the packages cross into the row-separation conveyor. Then the row is extracted from the other rows on the row-extraction conveyor. Finally, as the packages travel on and along the singulating conveyor, they are aligned to the conveyor's outer edge and rotated, if necessary, to be properly singulated.

5 Claims, 3 Drawing Sheets

U.S. PATENT DOCUMENTS 7,607,533 B2    10/2009  Pressler et al.
2007/0295582 A1  12/2007  DePaso et al.
2008/0264757 A1  10/2008  Fourney

* cited by examiner

ROLLER-BELT DEPALLETIZER

BACKGROUND

The invention is related generally to power-driven conveyors and, more particularly, to depalletizers and singulators using a series of conveyor belts, some with article-supporting rollers.

Depalletizing conveyors are used to break up a pallet layer consisting of a compact arrangement of tightly packed articles, such as boxes, and convey the articles stripped from the pallet layer downstream in a single file. Typically, the articles forming the pallet layer are arranged roughly in rows and columns of varying lengths and widths, especially when the articles are not shaped or oriented alike. Some depalletizers operate by receiving palletized articles row by row on parallel strands of flat-top chains running at a different speed from the speed of immediately upstream or downstream conveyors. Each of the strands can be run at a different speed, or each can have a different length, which may be achieved by staggering the entrance or exit ends of the parallel strands. By conveying the articles disposed across the width of the depalletizer at different speeds or at higher or lower speeds over different distances, the strands of chain cause the articles stripped from a row of the pallet layer to fan out and separate. But staggered chains or chains operated at different speeds require more shafts and other drive components and take up much more valuable floor space.

SUMMARY

These shortcomings are addressed by a depalletizing system embodying features of the invention. The depalletizer comprises a first conveyor conveying a pallet layer in a first conveying direction. The pallet layer is made up of a series of rows of packages. A second conveyor is arranged end to end with the first conveyor and comprises a conveyor belt having upstream and downstream ends. Positioning elements are positioned at regular intervals on the conveyor belt between the upstream and downstream ends. Package-supporting rollers are disposed between the positioning elements. The rollers are actuated to rotate in the first conveying direction as the conveyor belt advances toward the downstream end to draw the pallet layer row by row from the first conveyor over the upstream end and to accelerate each row atop the rollers in the first conveying direction to a positioning element. In this way, the second conveyor separates each row from a trailing row at the regular intervals. A third conveyor having first and second sides and first and second ends is arranged transverse to the second conveyor at the downstream end. The third conveyor receives a row of packages over the first side from the downstream end of the first conveyor and conveys the row of packages toward the second end in a second conveying direction transverse to the first conveying direction.

Another aspect of the invention provides a method for depalletizing a pallet layer. The method comprises: (a) advancing a bundle of packages arranged generally in rows in a first conveying direction; (b) accelerating the packages forward row by row; (c) separating the rows of packages from each other at regular intervals in the first conveying direction; and (d) conveying the packages of a separated row in a second conveying direction transverse to the first direction.

BRIEF DESCRIPTION OF THE DRAWINGS

These aspects and features of the invention, as well as its advantages are better understood by referring to the following description, appended claims, and accompanying drawings, in which:

DETAILED DESCRIPTION

Figure 1:
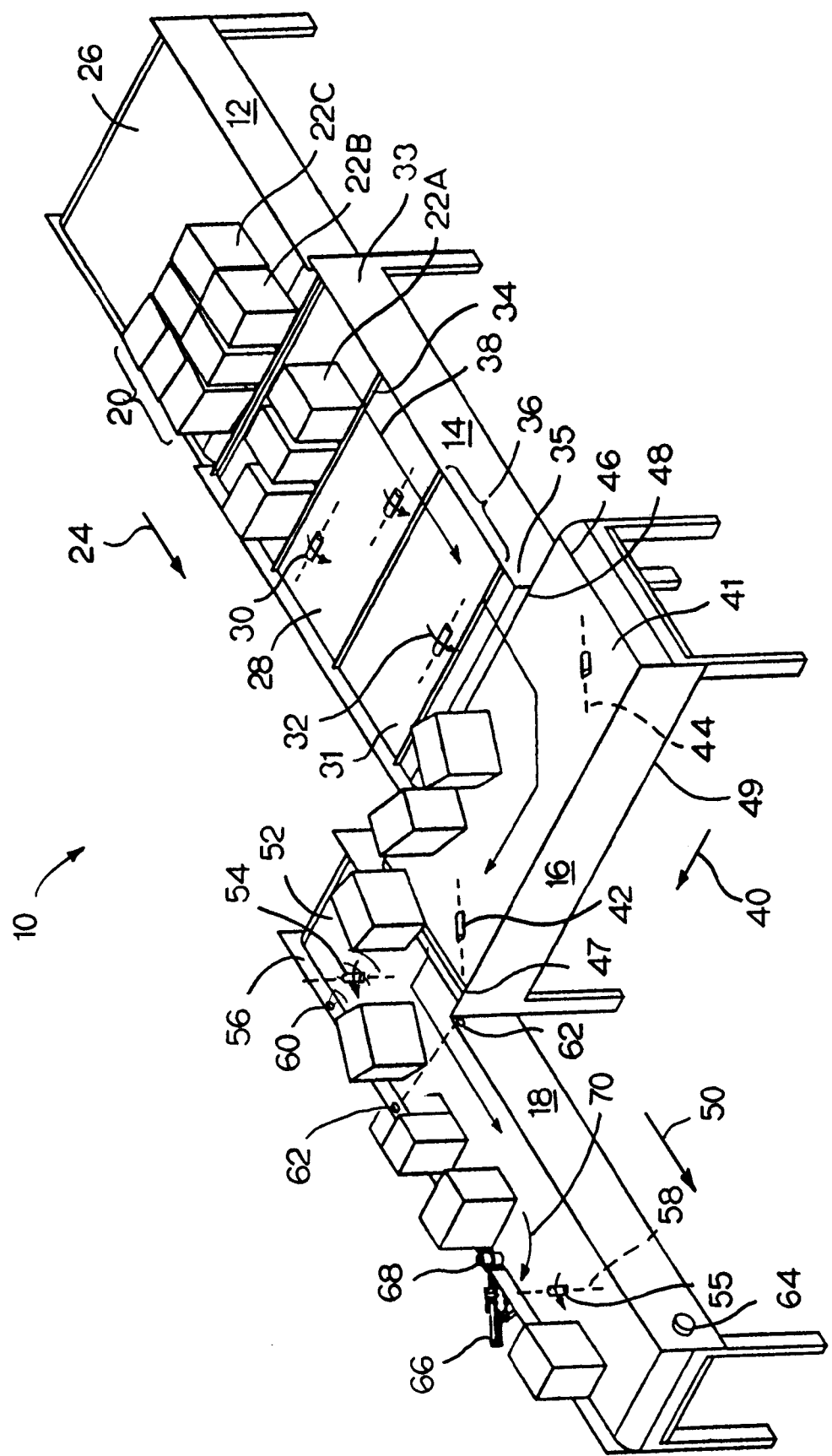
FIG. 1 is pictorial view of one version of a depalletizing system embodying features of the invention.

One version of a depalletizing conveyor system, whose purpose is to separate a bundle of packages grouped together in a layer as part of a larger stack, is shown in FIG. 1. The depalletizer 10 comprises four conveyors: a set-down conveyor 12, a row-separating conveyor 14, a row-extraction conveyor 16, and a singulating conveyor 18. A layer 20, or bundle, of packages from a pallet stack is set down onto the set-down conveyor by a large gripper (not shown). The pallet layer is generally formed of a series of rows, such as the three rows 22A, 22B, 22C. Of course, depending on the shapes and orientations of the packages in a layer, some rows may have different numbers of packages from other rows. The set-down conveyor conveys the pallet layer in a first conveying direction 24 on a conveyor belt 26, for example, toward the row-separation conveyor arranged end to end with the set-down conveyor.

The row-separation conveyor 14 uses a registration conveyor belt 28 that has a plurality of package-supporting rollers 30 that extend through the thickness of the conveyor belt and ride on bearing surfaces underlying the belt along a top carryway 31. One example of such a belt is described in U.S. Pat. No. 7,426,992, "Systems and Methods for Providing an Improved Timing Conveyor," Sep. 23, 2008, to Matthew L. Fourney. This patent is incorporated by reference into this disclosure. As the conveyor belt advances in the first conveying direction 24 from an upstream end 33 to a downstream end 35, the rollers rotate forward as indicated by arrows 32 to propel, or accelerate, the packages atop the rollers in the first conveying direction. Thus, the rollers are actuated to rotate continuously while in contact with the bearing surface underlying the carryway. Because the rollers are mounted on axles that are perpendicular to the first conveying direction to rotate in line with the advance of the belt, the rollers are referred to as in-line rollers. As the leading row 22A of packages crosses onto the row-separation conveyor, the packages are pulled onto this second conveyor by contacting the actuated in-line belt rollers. This first separation of packages in the depalletizer occurs by pulling gaps between the rows of the pallet layer. Positioning elements, in the form of flights 34 protruding above the tops of the rollers, are positioned across the conveyor belt at precise, regular intervals 36. After being pulled onto the row-separation conveyor belt by the rollers, the row 22A is accelerated forward along the belt in the direction of arrow 38, until its leading edge registers against the flight extending across the width of the belt. This leading-edge alignment is needed to sequentially feed a row of packages onto a downstream conveyor at the proper time.

When the separated row reaches the downstream end of the row-separation conveyor, it crosses onto the row-extraction conveyor 16, which advances in a second conveying direction 40 transverse or perpendicular to the first conveying direction 24. The row-extraction conveyor includes a conveyor belt 41 with rollers 42 arranged to rotate freely, i.e., not actuated by riding on bearing surfaces, on axes 44 oblique to the second conveying direction, for example, at an angle of 45°. (Non-actuated rollers are also referred to as passive rollers.) One example of a suitable roller belt is the Series 400 45° Angled Roller belt manufactured and sold by Intralox, L.L.C. of Harahan, La., U.S.A. The rollers in the 45° Series 400 belt have an outer peripheral tread made of a relatively high-friction thermoplastic elastomer to grip the packages. The conveyor belt advances from a first end 46 to an opposite second end 47 between first and second sides 48, 49 of the conveyor. As a separated row of packages crosses onto the row-extraction conveyor's belt rollers over its first side 48, the packages in the separated row are conveyed in the second conveying direction atop the rollers in the row-extraction conveyor. In this way, the row-extraction conveyor extracts a leading row of packages from all the trailing rows by changing the motion of each separated row of packages from parallel (packages in a row traveling generally abreast) in the first conveying direction to serial (packages in a row traveling generally in single file) in the transverse second conveying direction.

At the second end 47 of the row-extraction conveyor, the singulating conveyor 18 is arranged to advance in a third conveying direction 50 transverse, or perpendicular, to the second conveying direction 40. The singulating conveyor preferably runs at a higher speed to pull an even larger gap between the packages, which are fed off the second end 47 of the row-extraction conveyor over the side of the singulating conveyor. The singulating conveyor uses a conveyor belt 52, such as an Intralox® Series 400 Angled Roller belt, with actuated oblique rollers 54 embedded in the belt to push the packages in the direction of arrow 55 into alignment against an outer wall 56 of the conveyor. The rollers are arranged to rotate on axes 58, preferably at an angle of 45° measured from the third conveying direction 50. As the packages travel along the outer wall of the conveyor, an ultrasonic sensor 60 measures the width of the packages. The length of the package is also measured by using photo eyes 62 along the wall and an encoder 64 on the conveyor's drive shaft. A programmable logic controller (PLC, not shown) receiving signals from the sensors compares the width of the package to its length and determines whether to actuate a bump turn. A bump-turn actuator 66, when selectively signaled by the PLC, quickly extends a cushioned roller 68 in front of the outer corner of a package oriented the wrong way, and causes it to rotate 90° as indicated by curved arrow 70. After the bump turn, the selectively rotated packages are again aligned with the downstream packages in a single file against the outer wall of the conveyor by the rotation of the actuated oblique belt rollers in the singulating conveyor.

Thus, the conveyor depalletizes and singulates packages by first pulling a gap in the leading row of a pallet layer when the packages cross into the row-separation conveyor. Then the row is extracted from trailing rows when the packages cross onto the row-extraction conveyor. Finally, as the packages travel on and along the singulating conveyor, they are aligned to the conveyor's outer edge and rotated, if necessary, to be properly singulated.

Figure 2:
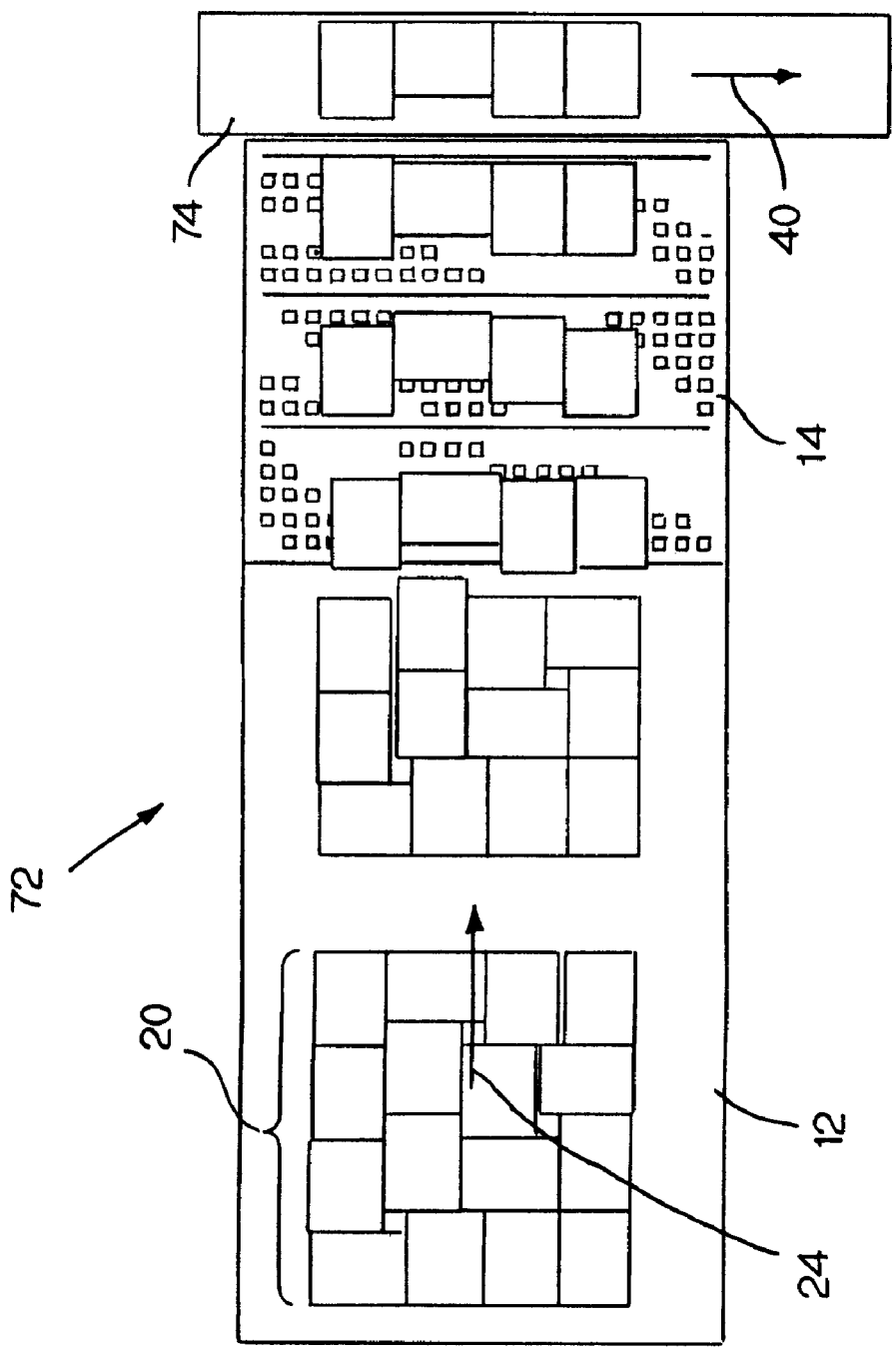
FIG. 2 is a top plan schematic of another version of a depalletizing system embodying features of the invention.

Another version of a depalletizer embodying features of the invention is shown in FIG. 2. Like the depalletizer in FIG. 1, this depalletizer 72 includes a set-down conveyor 12 and a row-separation conveyor 14, which receive the pallet layer 20, convey it in the first conveying direction 24, and separate its rows. A takeaway conveyor 74 arranged transverse to the row-separation conveyor at its downstream end receives packages from the separated rows in parallel over the abutting side of the takeaway conveyor for transport in the second conveying direction 40. The takeaway conveyor could be a passive-roller conveyor belt with oblique rollers, like the row-extraction conveyor belt 41 in FIG. 1, or with transverse rollers, i.e., rollers rotatable on axes parallel to the second conveying direction, a low-friction, flat-top conveyor belt, an actuated-roller conveyor belt, like the singulating conveyor belt 52 of FIG. 1, or even a powered roller conveyor, for example.

Figure 3:
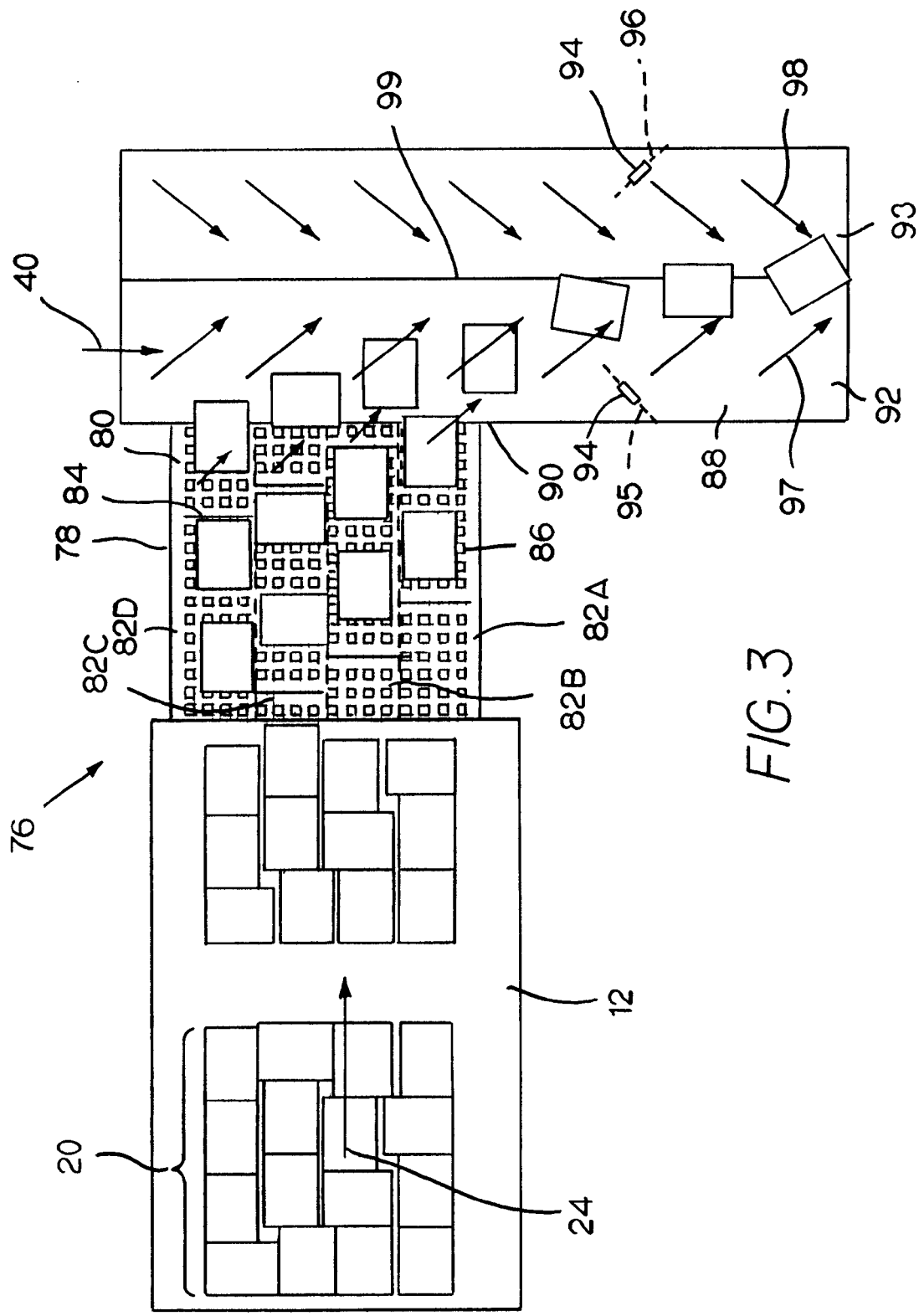
FIG. 3 is a top plan schematic of a third version of a depalletizing system embodying features of the invention.

Yet another version of a depalletizer is shown in FIG. 3. This depalletizer 76 has a set-down conveyor 12 conveying a pallet layer 20 in the first conveying direction 24 to a multi-lane row-separation conveyor 78. The row-separation conveyor includes a single wide conveyor belt 80 divided into parallel lanes 82A-D or a set of narrow side-by-side conveyor belts forming the lanes. Positioning elements 84 are staggered in the first conveying direction from lane to lane. Actuated in-line rollers 86 pull the packages from the leading row of the pallet layer from the set-down conveyor onto the row-separation conveyor belt or belts and propel them forward to the downstream positioning element, which is preferably a flight. Because the flights are staggered from lane to lane, the packages from a given row of the pallet layer exit the downstream end of the row-separation conveyor at different times. A singulating conveyor 88 arranged transverse to the row-separation conveyor receives the packages over an abutting side 90 of the singulating conveyor. In this example, the singulating conveyor is shown as one or more conveyor belts advancing in the second conveying direction 40. The one or more belts are divided across the width of the conveyor into two half widths 92, 93. Actuated rollers 94 on each half are arranged to rotate on axes 95, 96 oblique to the second conveying direction. The axes are mirror images of each other on each half of the conveyor. The actuated rollers on each half rotate in oblique directions 97, 98 to push articles toward the centerline 99 of the conveyor as the belt advances in the second conveying direction.

What is claimed is:

1. A depalletizer comprising:
   a first conveyor conveying a pallet layer in a first conveying direction, the pallet layer comprising a series of rows of packages;
   a second conveyor arranged end to end with the first conveyor and comprising a conveyor belt having upstream and downstream ends and positioning elements positioned at regular intervals between the upstream and downstream ends and actuated package-supporting rollers disposed between the positioning elements, wherein the rollers are actuated to rotate in the first conveying direction as the conveyor belt advances toward the downstream end to draw the pallet layer row by row from the first conveyor over the upstream end and accelerate each row atop the rollers in the first conveying direction to a positioning element to separate each row from a trailing row at the regular intervals;
   a third conveyor having first and second sides and first and second ends and arranged transverse to the second conveyor at the downstream end to receive a row of packages over the first side from the downstream end of the second conveyor and convey the row of packages toward the second end in a second conveying direction transverse to the first conveying direction;

wherein the third conveyor comprises at least one conveyor belt advancing in the second conveying direction and having rollers on a first half width of the conveyor belt actuated to rotate in a first direction oblique to the second conveying direction to push packages toward an opposite second half width as the at least one conveyor belt advances in the second conveying direction and rollers on the second half width actuated to rotate in a second direction oblique to the second conveying direction to push packages toward the first half width as the at least one conveyor belt advances in the second conveying direction.

2. A depalletizer comprising:

a first conveyor conveying a pallet layer in a first conveying direction, the pallet layer comprising a series of rows of packages;

a second conveyor arranged end to end with the first conveyor and comprising a conveyor belt having upstream and downstream ends and positioning elements positioned at regular intervals between the upstream and downstream ends and actuated package-supporting rollers disposed between the positioning elements, wherein the rollers are actuated to rotate in the first conveying direction as the conveyor belt advances toward the downstream end to draw the pallet layer row by row from the first conveyor over the upstream end and accelerate each row atop the rollers in the first conveying direction to a positioning element to separate each row from a trailing row at the regular intervals;

a third conveyor having first and second sides and first and second ends and arranged transverse to the second conveyor at the downstream end to receive a row of packages over the first side from the downstream end of the second conveyor and convey the row of packages toward the second end in a second conveying direction transverse to the first conveying direction;

wherein the third conveyor comprises a conveyor belt having freely rotatable package-supporting rollers arranged to rotate on axes oriented oblique to the second conveying direction and wherein the row of packages crosses from the second conveyor to the third conveyor directly onto the obliquely arranged freely rotatable package-supporting rollers of the conveyor belt.

3. A depalletizer as in claim 2 further comprising a fourth conveyor having first and second sides and arranged transverse to the third conveyor to receive packages from the second end of the third conveyor over the first side of the fourth conveyor, wherein the fourth conveyor comprises a conveyor belt having actuated rollers rotating in a direction to direct packages atop the rollers toward the second side of the fourth conveyor.

4. A depalletizer as in claim 3 further comprising a package-orientation sensor positioned along the fourth conveyor and a retractable projection disposed along the second side of the fourth conveyor selectively retractable from a retracted position out of contact with the packages to an extended position into the flow of the packages along the second side of the fourth conveyor to cause with the actuated rollers a package in contact with the projection to pivot 90° about the projection depending on the orientation of the package determined by the sensor.

5. A depalletizer comprising:

a first conveyor conveying a pallet layer in a first conveying direction, the pallet layer comprising a series of rows of packages;

a second conveyor arranged end to end with the first conveyor and comprising a conveyor belt having upstream and downstream ends and positioning elements positioned at regular intervals between the upstream and downstream ends and actuated package-supporting rollers disposed between the positioning elements, wherein the rollers are actuated to rotate in the first conveying direction as the conveyor belt advances toward the downstream end to draw the pallet layer row by row from the first conveyor over the upstream end and accelerate each row atop the rollers in the first conveying direction to a positioning element to separate each row from a trailing row at the regular intervals;

a third conveyor having first and second sides and first and second ends and arranged transverse to the second conveyor at the downstream end to receive a row of packages over the first side from the downstream end of the second conveyor and convey the row of packages toward the second end in a second conveying direction transverse to the first conveying direction;

wherein the conveyor belt in the second conveyor is divided into parallel lanes across the width of the conveyor belt and wherein the positioning elements in each lane are staggered in the first conveying direction from the positioning elements in the other lanes.

* * * * *